Feb. 14, 1967    L. E. FREEMAN    3,303,600
PET PROTECTING BAIT HOLDER
Filed June 1, 1965
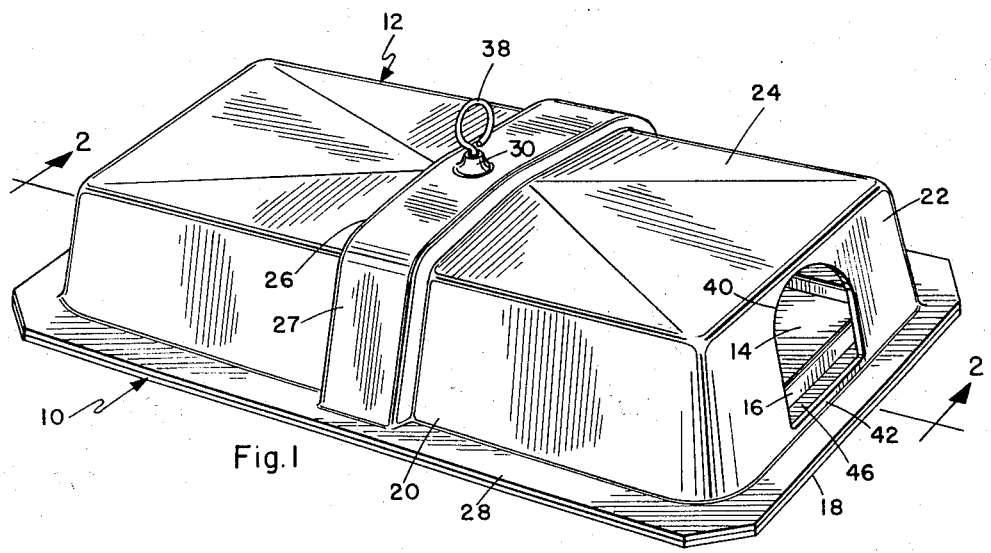
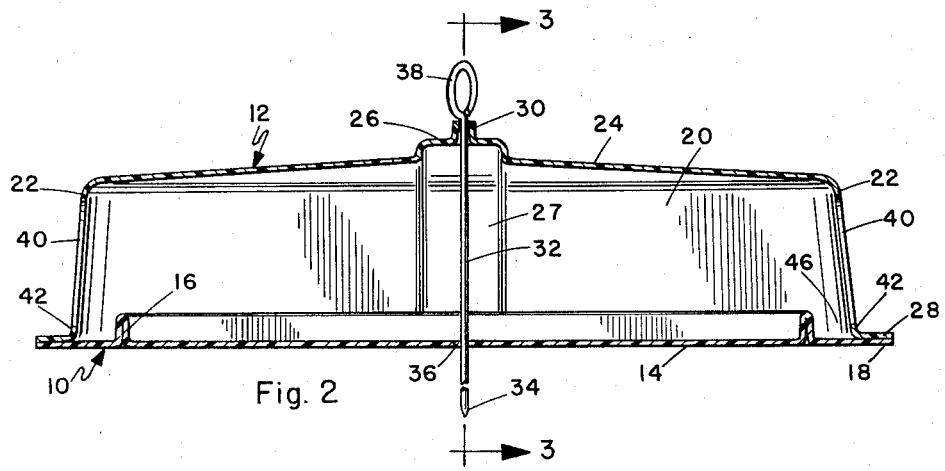
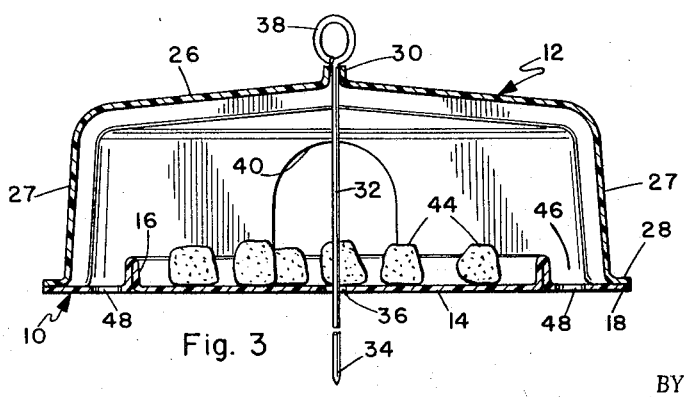
INVENTOR.
LUTHER E. FREEMAN
BY *Knox & Knox*

3,303,600
PET PROTECTING BAIT HOLDER
Luther E. Freeman, 5719 Adelaide Ave.,
San Diego, Calif. 92115
Filed June 1, 1965, Ser. No. 459,997
1 Claim. (Cl. 43—131)

The present invention relates to poison bait dispensing and more specifically to a pet protecting bait holder.

The primary object of this invention is to provide a bait holder in which the bait is enclosed in a cover with ready access for snails, slugs and other garden pests, but which is inaccessible to pets, even small animals and birds.

Another object of this invention is to provide a bait holder wherein the bait is held on a tray which protects the bait from surface water, the cover preventing the dissolving of bait by rain and irrigation sprinkler water.

Another object of this invention is to provide a bait holder wherein the cover is secured on the tray and the entire unit is held in place on the ground by a single ground-penetrating stake or pin.

A further object of this invention is to provide a bait holder, the covered design of which induces pests to remain inside and thus die on the tray, so that the dead pests are easily disposed of without handling by emptying the tray into a suitable disposal container.

The bait holder is illustrated in its preferred form in the drawing, in which:

FIGURE 1 is a perspective view of the bait holder as in use;

FIGURE 2 is a sectional view taken on line 2—2 of FIGURE 1; and

FIGURE 3 is a sectional view taken on line 3—3 of FIGURE 2.

Similar characters of reference indicate similar or identical elements and portions throughout the specification and throughout the views of the drawing.

The bait holder comprises a tray 10 and a cover 12, which can be made from any suitable material, thin sheet plastic being especially suitable since this is readily formed or molded and is usually inert to chemicals used in poison bait. Tray 10 is illustrated as generally rectangular in form, with a flat bottom portion 14 and an uninterrupted, upstanding barrier wall 16, disposed peripherally of the flat bottom portion 14 and beyond which is a unitary outwardly extending horizontal flange 18, which may be designated the tray flange, coplanar with said bottom portion 14. Cover 12 is a hollow pyramidal box-like structure with inclined side walls 20 and end walls 22, and a unique top 24, which latter is constructed from very light-weight plastic sheet material in a novel manner to provide for adequate crush-resistant strength. The cover, like the tray 10, is somewhat elongated and has a transverse raised arch or saddle portion 26 substantially across the center of the doomed structure, with near vertical lateral posts 27 at the ends of the arch or saddle portion 26 and unitary with the inclined side walls 20. The lateral posts 27 are coterminuous with the lower edge of the side walls 20 and these posts seat onto the tray flange 18, thus resisting downward or glancing crushing forces to which such ground-mounted devices are exposed, especially where dogs and other large pets are kept.

The lower peripheral edge of the walls has an outwardly extending flange 28 which seats closely on the tray flange 18. At the center of arch or saddle portion 26 is a raised tubular neck 30 through which a stake or retaining pin 32 is inserted, the pin having a ground-penetrating point 34 which passes through a hole 36 in the bottom portion 14 of tray 10 and into the ground. The upper end of retaining pin 32 has a ring 38 or otherwise suitably enlarged head, to facilitate removal and to clamp down on neck 30 for holding the cover securely in place. End walls 22 have openings 40 sufficiently large to admit the usual garden pests, but too small to admit small pets or birds. The lower edges of openings 40 are slightly above the flange 28, forming small raised ledges 42 which keep water on the flange from running into the bait holder.

Poisoned bait, indicated at 44 in FIGURE 3, is placed on tray 10 and the cover 12 is put in place, the unit being secured by pin 32 in a suitable position on the ground. Pests can enter through openings 40 and climb over barrier wall 16 to reach the bait. Since snails, slugs and other pests prefer covered areas, especially when food is present, they tend to remain in the tray and die inside the bait holder. Thus the poisoned pests are also kept out of reach of pets. To dispose of dead pests it is a simple matter to remove the cover and empty the tray into a suitable receptacle, without having to handle the pests or the bait.

Cover 12 is larger within its lower edge than the bottom 14, so that a channel 46 is formed between the cover and wall 16. This arrangement spaces the wall 16 inwardly from openings 40 and aids in preventing water from reaching the bait in the tray. If any water should enter through openings 40, as from driving rain or a nearby sprinkler, it will tend to remain in the channel 46. To avoid retaining any quantity of water in the channel, drainage holes 48 may be provided in flange 18 at suitable positions, such as in the area of the arch portion 26 where water might tend to accumulate. The retaining pin 32 is a reasonably close fit through neck 30 which, due to its upward extension, tends to shed water and prevent leakage into the tray.

The fit of the cover on the tray is not at all critical and there are no special interfitting parts, which simplifies manufacture and facilitates use of the article. The unit rests firmly on the ground and cannot be tipped over without completely removing the retaining pin, yet is easily picked up and moved to different locations when necessary. Bait is kept dry and accessible only to the pests for which it is intended.

It is understood that minor variation from the form of the invention disclosed herein may be made without departure from the spirit and scope of the invention, and that the specification and drawing are to be considered as merely illustrative rather than limiting.

I claim:

A pet protecting bait holder, comprising:
   a bait holding tray having a substantially flat bottom portion with a raised barrier wall peripheral thereto and a tray flange extending horizontally outwardly from said wall generally coplanar with said bottom portion;
   an upwardly domed cover having side enclosing walls, the lower edge of said walls being spaced outwardly of said barrier wall to define a channel between the barrier wall and adjacent portions of said side walls, and having a horizontally outwardly extending flange substantially peripherally coextensive with and seating closely on said tray flange;

certain of said side enclosing walls having pest admitting openings;

a retaining pin extending through said cover and said tray and having a ground penetrating point to secure the bait holder to the ground;

and said cover being of light-weight plastic sheet material and having crush-resistant means including a saddle extending over the upper central portion thereof, said pin having a head engaging said saddle, and vertical lateral posts supporting the ends of the saddle portion, the lower ends of said posts seating on said tray flange.

References Cited by the Examiner

UNITED STATES PATENTS

| 1,561,644 | 11/1925 | Hanson | 119—52 |
| 2,480,724 | 8/1949 | Feussner | 43—131 |
| 2,736,127 | 2/1956 | McCann | 43—131 |
| 2,764,840 | 10/1956 | Mayfield | 43—131 |
| 2,837,861 | 6/1958 | Grahm | 43—131 |
| 2,977,711 | 4/1961 | Starr | 43—131 |

FOREIGN PATENTS

| 290,804 | 8/1953 | Switzerland. |
| 342,782 | 1/1960 | Switzerland. |

SAMUEL KOREN, *Primary Examiner.*

ALDRICH F. MEDBERY, *Examiner.*